United States Patent
Zimmerman et al.

(10) Patent No.: US 9,465,567 B1
(45) Date of Patent: *Oct. 11, 2016

(54) PRINTER FORMATTER IN A REMOVABLE CARD

(75) Inventors: Gary D. Zimmerman, Garden Valley, ID (US); Mark D. Montierth, Meridian, ID (US); Richard D. Taylor, Eagle, ID (US)

(73) Assignee: Marvell International Technology Ltd., Hamilton (BM)

( * ) Notice: Subject to any disclaimer, the term of this patent is extended or adjusted under 35 U.S.C. 154(b) by 982 days.

This patent is subject to a terminal disclaimer.

(21) Appl. No.: 13/088,617

(22) Filed: Apr. 18, 2011

Related U.S. Application Data

(63) Continuation of application No. 11/846,495, filed on Aug. 28, 2007, now Pat. No. 7,944,576, which is a continuation of application No. 09/675,920, filed on Sep. 29, 2000, now Pat. No. 7,301,655.

(51) Int. Cl.
*G06F 3/12* (2006.01)
*G06F 15/00* (2006.01)

(52) U.S. Cl.
CPC ........... *G06F 3/1247* (2013.01); *G06F 3/1225* (2013.01); *G06F 3/1228* (2013.01)

(58) Field of Classification Search
CPC .... G06F 3/1225; G06F 3/1228; G06F 3/123; G06F 8/65; G06F 8/70
USPC ............. 358/1.1, 1.9, 1.11, 1.12, 1.13, 1.14, 358/1.15, 1.16, 1.17, 1.18
See application file for complete search history.

(56) References Cited

U.S. PATENT DOCUMENTS

| | | | |
|---|---|---|---|
| 4,316,720 A | | 2/1982 | Ackerman |
| 5,540,601 A | * | 7/1996 | Botchek ......................... 439/502 |
| 5,825,401 A | * | 10/1998 | Wadley .................... B41J 2/442 |
| | | | 347/247 |
| 5,930,553 A | | 7/1999 | Hirst et al. |
| 6,113,208 A | | 9/2000 | Benjamin et al. |
| 6,333,790 B1 | * | 12/2001 | Kageyama .............. G06F 3/121 |
| | | | 358/1.15 |
| 6,426,801 B1 | | 7/2002 | Reed |
| 6,438,643 B1 | | 8/2002 | Ohara et al. |
| 6,538,687 B1 | | 3/2003 | Saito et al. |
| 6,538,762 B1 | | 3/2003 | Terashima et al. |
| 6,587,140 B2 | | 7/2003 | No |
| 6,606,161 B2 | | 8/2003 | Murata |
| 6,665,089 B1 | | 12/2003 | Austin et al. |
| 6,801,328 B2 | | 10/2004 | Tsukamoto et al. |
| 7,301,655 B1 | | 11/2007 | Zimmerman et al. |
| 2003/0016376 A1 | | 1/2003 | Narushima |

\* cited by examiner

*Primary Examiner* — Thierry L Pham

(57) ABSTRACT

A method and system for printing comprises executing a formatter program on a removable Personal Computer (PC) card that controls printer controller functions of a printer. Printer formatter ready data is received from a host machine at a first interface of the removable PC card and print engine ready data is sent to the printer from a second interface of the removable PC card. A version of the formatter program is compared to a version of an updated formatter program. The updated formatter program is requested if the version of the formatter program is different than the version of the updated formatter program. The updated formatter program is downloaded from the host machine using the first interface when the second interface is coupled to the printer.

12 Claims, 6 Drawing Sheets

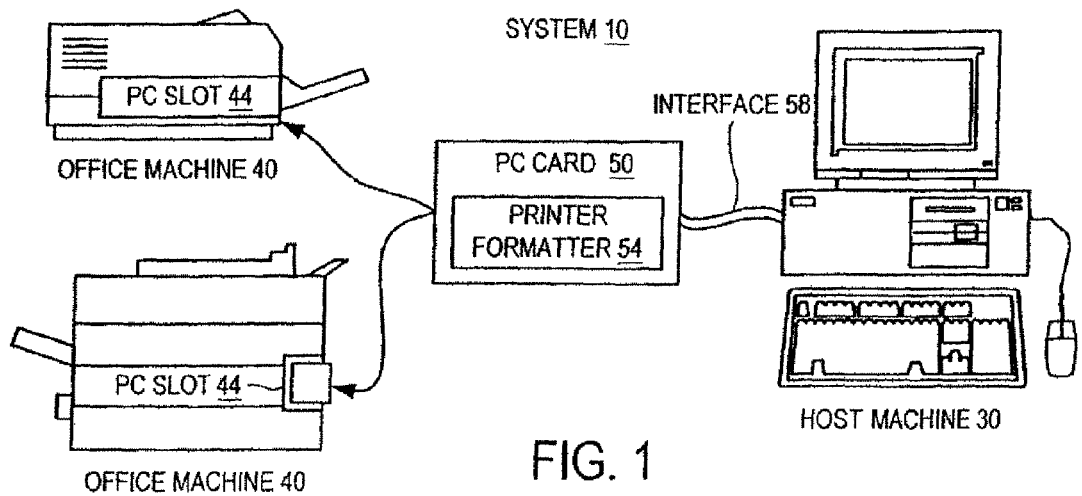
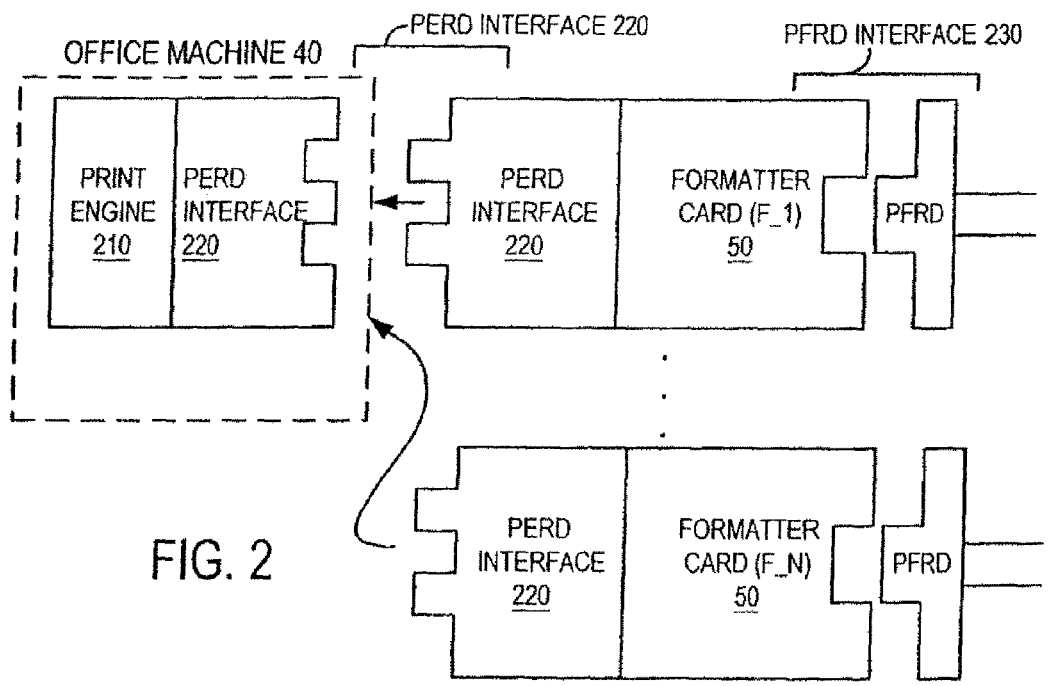

PRINTER FORMATTER IN A REMOVABLE CARD

CROSS-REFERENCE TO RELATED APPLICATIONS

This Application is a continuation of U.S. application Ser. No. 11/846,495, filed Aug. 28, 2007, which is a continuation of U.S. application Ser. No. 09/675,920, filed Sep. 29, 2000. The disclosures of the applications referenced above are incorporated herein by reference.

BACKGROUND OF THE INVENTION

The market for computer peripherals is highly competitive. In these markets, a large volume of sales is needed in order to be profitable since typically there is a low per product profit margin In order to obtain a reasonable return on investment, the cost to manufacture the product must be kept low relative to the price of the product. Consequently, the successful manufacture and sale of computer peripherals often depend on reducing production costs and shortening the time-to-market of the products.

In the manufacture of computer peripherals, there are often many components and sub-assemblies that require testing and integration with other components and sub-assemblies. This process, which is generally known as system integration, is further complicated by the fact that these components and sub-assemblies are often manufactured by different parties.

For example, in the laser printer market, one party typically manufactures the print engine and another party is responsible for manufacturing the printer formatter that provides formatting functions to the print engine.

Furthermore, one sub-assembly cannot be completed until all components for that sub-assembly have been received and proper operation is verified with the other components. For example, since the printer formatter is integrated with the print engine, the manufacturer of the printer formatter has a shortened development time. The development time is shortened since the print engine manufacturer requires sufficient time to integrate the printer formatter with the print engine and to verify the proper operation of the printer formatter with the components of the print engine.

As can be appreciated, there are many costs and time consuming steps that are involved in system integration. Accordingly, manufacturers are constantly attempting to find ways to reduce costs and improve the efficiency of the above-described process.

FIG. 8 illustrates a block diagram of a conventional laser printer 1100. It is noted that the printer 1100 includes a printer controller 1104 that is coupled to a print engine 1108. The printer controller is also coupled to a printer controller interface 1118 for connecting a cable 1114 to the printer controller 1104. Since the printer controller 1104 is housed within the enclosure of the printer 1100, it is apparent that repairing or updating the printer controller 1104 is a complex and costly procedure that is not accessible to the average computer user. It would be desirable for a mechanism that allows the user to be able to easily access, configure, and upgrade the formatter. Unfortunately, this is not possible with prior art printer system configurations.

Manufacturers of laser printers have typically focused their efforts at reducing costs by employing one of two different approaches. Unfortunately, these approaches, as will be described hereinafter, offer only minimal improvements, often inject inefficiencies in other areas, which often negate any improvements gained by the approach, and do not address the inefficiencies of the current upgrade solution.

The first prior art approach is to super-integrate the components of the printer formatter. This approach can reduce system costs. However, if the super-integrated chip is designed onto an embedded formatter (i.e., a formatter embedded into the print engine), then the development schedule for the formatter chip is shortened by the manufacturing lead-time of the print engine.

Additionally, it is difficult to integrate all the functional blocks of the formatter (e.g., the processor, RAM, ROM, and interface) into a single integrated circuit. Typically, it is the size of the ROM and RAM that is the limiting factor. Accordingly, it is desirable to have a mechanism to reduce the amount of code that needs to be stored in the memory, so that a higher level of integration can be achieved.

Second, upgrades in formatter functionality are difficult and costly to perform by the print engine manufacturer. For example, if a user desires a new functionality, since the formatter is within the printer enclosure, and it is not easily accessible to the user, the users' options are very limited.

The first option is to buy a new printer with a new formatter integrated circuit having the new function. The second option is to send the printer to the print engine manufacturer, who in turn installs a new formatter integrated circuit in the printer and ensures compatibility with the print engine. Even then, the print engine manufacturer often times needs to perform extensive re-work on the printer to install the new formatter. As can be appreciated, this upgrade solution is not very efficient and relatively costly.

Another attempt to reduce costs and increase efficiency is to integrate the printer formatter with other electronics internal to the printer. These electronics can include the laser controller, which is commonly referred to as the "DC controller." Unfortunately, this approach suffers from several disadvantages.

First, although this approach reduces costs, the approach also can increase costs of developing and testing the DC controller because the printed circuit board technology is not robust enough for the digital printer formatter.

Second, the components of a laser printer are highly dependent on each other. For example, the DC controller, the laser print engine, and the digital printer formatter are connected together in a particular format and are dependent upon each other. Consequently, the printer formatter cannot be replaced without requiring corresponding changes to the other components.

Based on the foregoing, it is desirable to provide a printer formatter that is external to the printer enclosure, easily removable, easily configurable, and that overcomes the disadvantages discussed above.

SUMMARY OF THE INVENTION

A method and system for integrating a printer controller with a PC card. This system includes an office machine and a removable PC card that can be operationally coupled with the office machine. The office machine has a rendering engine (e.g., a print engine) for rendering images (e.g., printing text or images) and a PC card slot for operationally coupling to a removable PC card and for receiving print engine ready data (PERD). The PC card slot is coupled to the print engine for providing the PERD thereto. The PC card has a printer formatter for receiving printer formatter ready data and for converting it into PERD and providing printer formatter functions. When the PC card is operationally coupled to the PC card slot, the print engine ready data can be selectively transferred from the PC card to the office machine.

BRIEF DESCRIPTION OF THE DRAWINGS

The present invention is illustrated by way of example, and not by way of limitation, in the figures of the accompanying drawings and in which like reference numerals refer to similar elements.

FIG. 1 is a block diagram of a computer system in which the PC card printer formatter of the present invention can be implemented.

FIG. 2 is a block diagram illustrating in greater detail the interface between the printer engine and the PC card printer formatter configured in accordance with one embodiment of the present invention.

DETAILED DESCRIPTION OF THE PREFERRED EMBODIMENT

Figure 3:
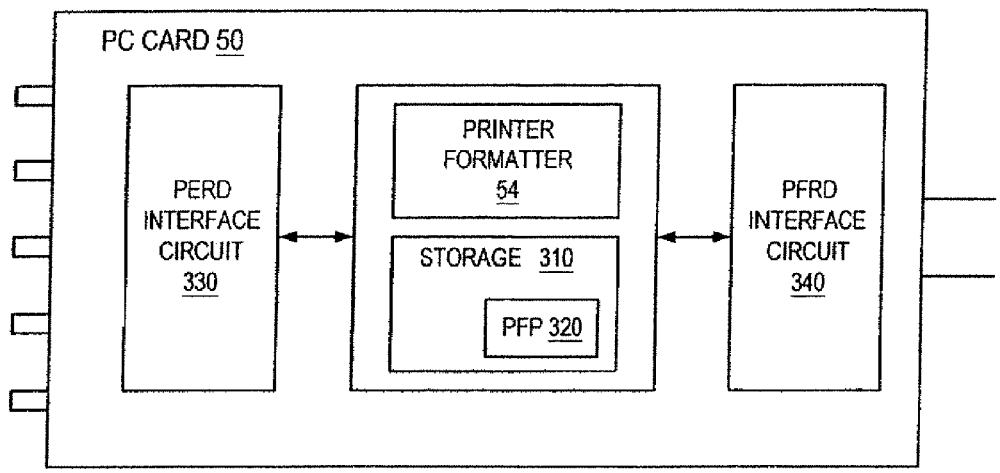
FIG. 3 is a block diagram illustrating in greater detail the PC printer formatter of FIG. 1 configured in accordance with one embodiment of the present invention.

A PC card printer formatter and a method of using the same are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Exemplary Computer System 10

FIG. 1 is a block diagram of a computer system 10 in which the printer formatter PC card of the present invention can be implemented. The system 10 includes a host machine 30 (e.g., a personal computer (PC)) that requires one or more services (e.g., printing services) and one or more office machines 40 (e.g., a first printer and a second printer). The office machine 40 includes a slot 44 (also referred to as a PC slot) for receiving a removable PC card 50. The slot 44 includes a print engine ready data (PERD) interface for receiving print engine ready data. As described in greater detail hereinafter, the PERD can be selectively provided by a printer formatter (also referred to herein as a printer controller) that is implemented in the PC card 50.

The PC card 50 is removably coupled to the slot 44 in the office machine 40. One aspect of the present invention is the provision of a printer formatter 54 in the removable PC card 50, which is hereinafter referred to also as printer formatter PC card 50 or simply as formatter card 50. For example, the form factor of the PC card 50 can be the form factor of the Personal Computer Memory Card International Association (PCMCIA) type 1, type II, or type III card, of a compact FLASH card, or other removable media formats. In other embodiments, the removable PC card can have the industrial design of a PCI card or ISA card.

It is noted that in a preferred embodiment, the PC card 50 has an interface 58 (e.g., a cable) that directly couples to the host machine 30 as shown in FIG. 1. Alternatively, the printer formatter PC card 50 may not have such an interface that couples directly to the host machine. In this alternative arrangement, a standard printer cable (not shown) is also needed. The host machine 30 can then utilize the standard printer cable to initialize, configure, or otherwise communicate with the printer formatter 54.

By separating the printer formatter 54 from the office machine 40 and its physical enclosure and integrating the printer formatter 54 into a unitary PC card 50, the printer formatter 54 can advantageously leverage the robust PC card manufacturing processing. Additionally, since PC cards are easy to use and generally familiar to users in other contexts, such as modem PC cards, network PC cards, and hard disk drive PC cards, the printer formatter 54 can now be installed and upgraded by the user without costly intervention by the printer engine manufacturer. As described in greater detail hereinafter, the present invention provides a printer formatter 54 having a simple repair strategy, an easy upgrade solution, lower product costs, and a shorter time-to-market.

FIG. 2 is a block diagram illustrating in greater detail the interface 220 between the printer engine 210 and the printer formatter PC card 50 and the interface 230 between the printer formatter PC card 50 and the office machine 40 in accordance with one embodiment of the present invention.

The office machine 40 includes a rendering engine, which can be a print engine 210 for printing text or other images. The print engine 210 can communicate with the printer formatter 54 when the PC card 50 is inserted into the slot 44. The print engine 210 communicates with the printer formatter 54 via a print engine ready data (PERD) interface 220.

In like manner, the PC cards 50 can communicate with the host machine 30 via a print formatter ready data (PFRD) interface 230 when the PC card 50 is coupled to the host machine 30. It is noted that multiple PC card formatters 50 (e.g., F_1 to F_N) can be developed and used with the same print engine 210. The present invention provides a printer formatter solution having a PERD interface 220 and PFRD interface 230 that can be flexibly coupled to the print engine 210 and the host machine 30, respectively.

The PERD interface 220 can be any industry standard computer port interface or a custom interface. The PFRD interface 230 can be any industry standard computer port interface that can be, but is not limited to an IEEE 1284 parallel port interface, a USB serial port interface, and an Ethernet interface.

PC Card 50

FIG. 3 is a block diagram illustrating in greater detail the PC card 50 having the printer formatter 54 of FIG. 1 configured in accordance with one embodiment of the present invention. The PC card 50 includes a printer formatter integrated circuit 54, a memory 310 for storing information (e.g., the printer formatter program (PFP) 320), a PERD interface circuit 330 for managing the communications on the PERD interface, and a PFRD interface circuit 340 for managing the communications on the PFRD interface. Preferably, the printer formatter integrated circuit 54 is implemented as an application specific integrated circuit (ASIC), and the memory 310 is implemented as a random access memory (RAM).

Figure 4:
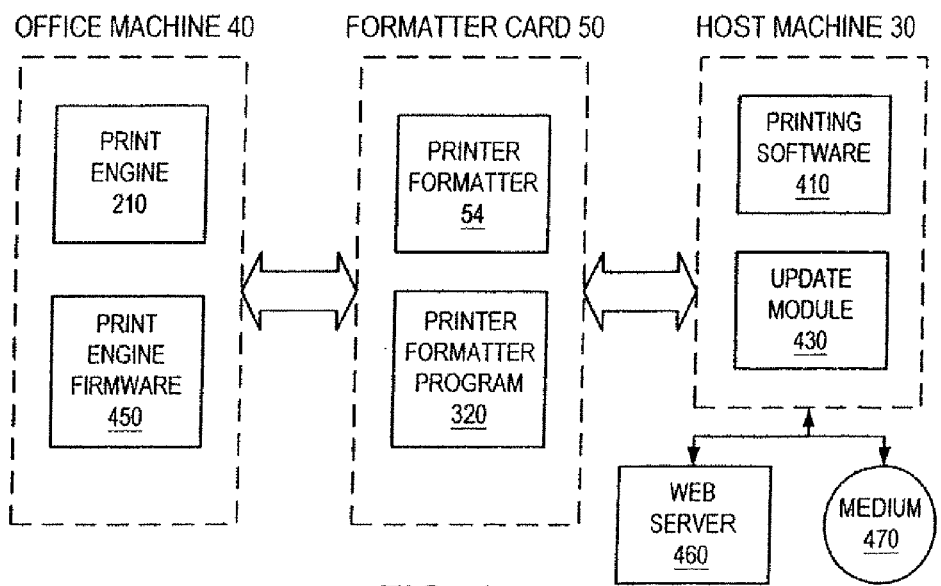
FIG. 4 is a block diagram illustrating key components of FIG. 1 that are configured in accordance with one embodiment of the present invention.

FIG. 4 is a block diagram illustrating key components of FIG. 1 that are configured in accordance with one embodiment of the present invention. As described earlier, the system 10 includes an office machine 40, a host machine 30, and a removable formatter PC card 50 that is coupled to the host 30 and the office machine 40. Printing software 410 for controlling the printing process and print jobs preferably runs on the host machine 30. An update module 430, which is described in greater detail hereinafter with reference to FIG. 7, preferably also resides on the host machine 30.

The formatter card 50 includes the printer formatter 54 and printer formatter software 320 that runs on the printer formatter 54. Initially, printer formatter program 320 (commonly referred to as printer formatter firmware) can reside in memory on the host machine 30 for downloading to the storage 310 of the formatter card 50 when needed.

It is noted that the printing software 410 and printer formatter software 320 (originals or upgrades) can be provided via a computer readable medium 470 (e.g., a compact disc) or downloaded from a web server 460 (e.g., an Internet web site) that is distributed from the host machine 30.

The office machine 40 includes the print engine 210 and print engine firmware 450 that is executed by the print engine 210. The print engine firmware 450 is well-known by those of ordinary skill in the art and is not described in greater detail hereinafter.

Method of Using the Printer Formatter PC Card

Figure 5:
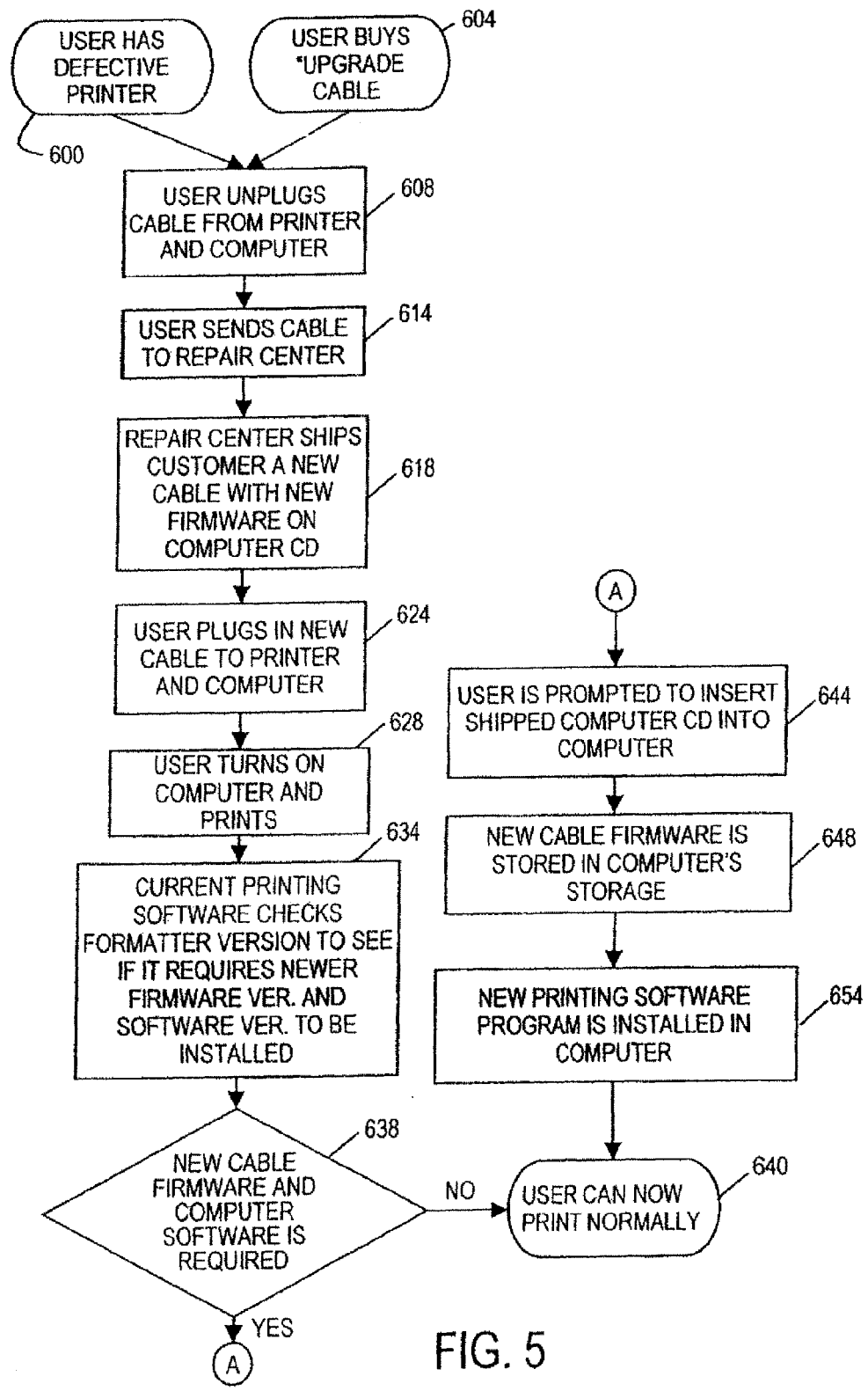
FIG. 5 is a flow chart illustrating the steps performed by a user to replace the card and printer controller in accordance with one embodiment of the present invention.

FIG. 5 is a flow chart illustrating the steps performed by a user to replace the PC card 50 in accordance with one embodiment of the present invention. The steps described herein are applicable whenever a new PC card is needed. For example, a user can purchases an "upgrade" PC card, or a user can send a defective PC card for repair.

In step 600, a user determines that a current printer formatter is defective. Alternatively, a user in step 604 determines that an upgrade in printer formatter capabilities is needed. In step 608, a user removes the PC card 50 from the office machine 40 and the host 30. In step 614, the user sends the PC card 50 to a repair center. In step 618, the repair center sends to the customer a new PC card 50 and computer media (e.g., a compact disc) having loaded thereon new firmware (e.g., a new version of the printer formatter program 320). Alternatively, if the user purchases an "upgrade" PC card, steps 608 and 614 can be replaced with the steps of discarding the current PC card 50 and purchasing a new PC card with computer media having new firmware loaded thereon.

In step 624, the user inserts the new (or repaired) PC card 50 to the slot 44 of the office machine 40 and also connects the PC card 50 to the host 30. In step 628, the user turns on the host 30 and prints a document. In step 634, current printing software 410 checks the formatter version to determine if a newer version of the printer formatter program 320 and a newer version of the printer software 410 need to be installed.

In decision block 638, a determination is made whether a newer version of the printer formatter program 320 or a newer version of the printer software 410 is needed. If no, then the user can print (step 640).

If a newer version of the printer formatter program 320 or a newer version of the printer software 410 is needed, then the user is prompted to insert the computer media (e.g., compact disc) into the host 30 (step 644). In step 648, a new printer formatter program 320 is stored in the storage (e.g., non-volatile 516) of the host 30. In step 654, a new printer software 410 is installed in the host 30. Processing then proceeds to step 640, where a user can print. The print process in accordance with one embodiment of the present invention is described in hereinafter with reference to FIG. 6.

Printer Software Operation

Figure 6:
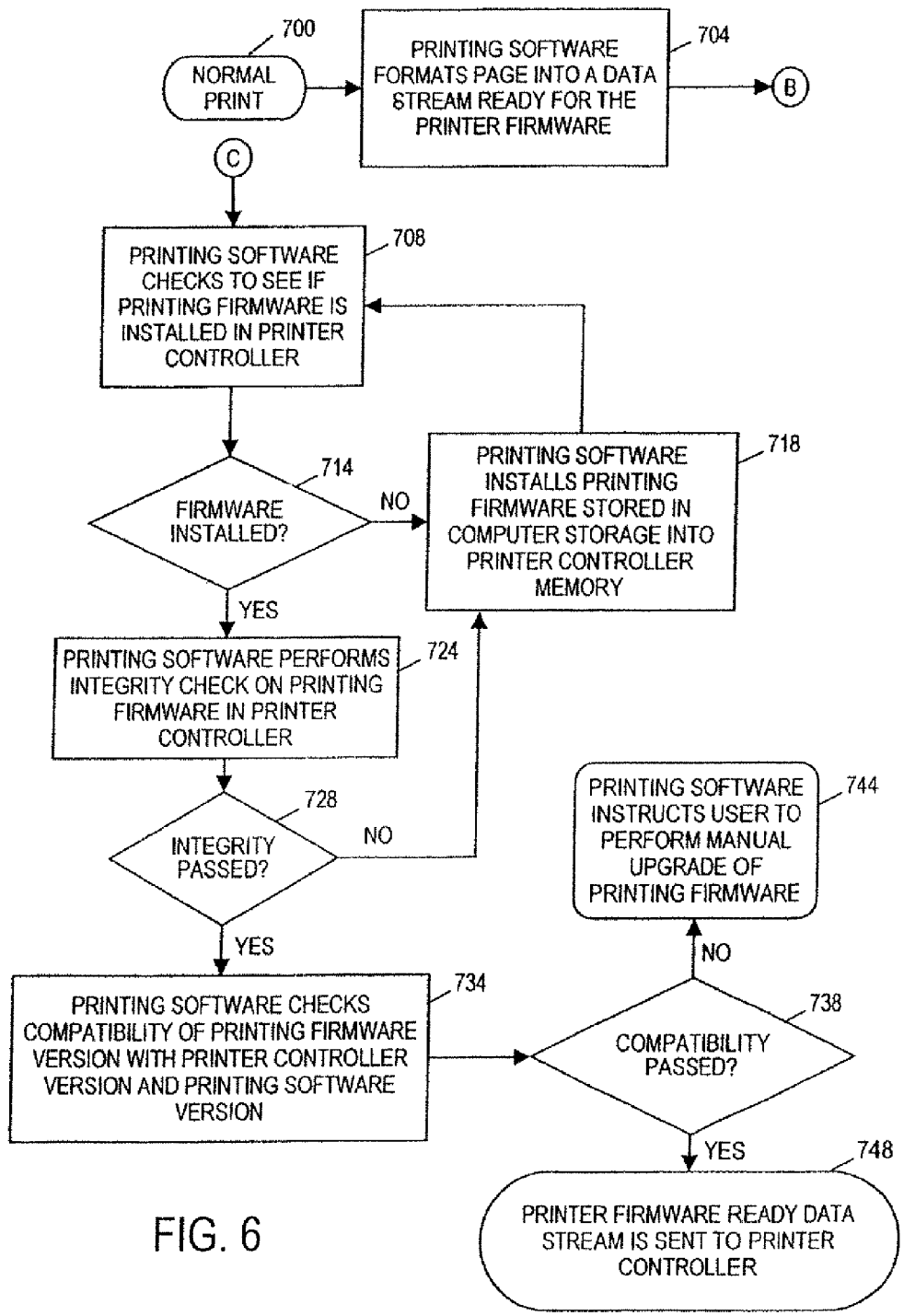
FIG. 6 is a flow chart illustrating the steps performed by the printing software of the system of FIG. 4 in accordance with one embodiment of the present invention.

FIG. 6 is a flow chart illustrating the steps performed by the printing software of the system of FIG. 4 in accordance with one embodiment of the present invention. In step 700, normal printing is initiated by the user. Printing can be initiated by a user selecting a print button in an application (e.g., a word processing document). In step 704, the printing software 410 formats a page into a data stream that is ready for the printer formatter 54. Processing then proceeds to step 54 of FIG. 7.

Figure 7:
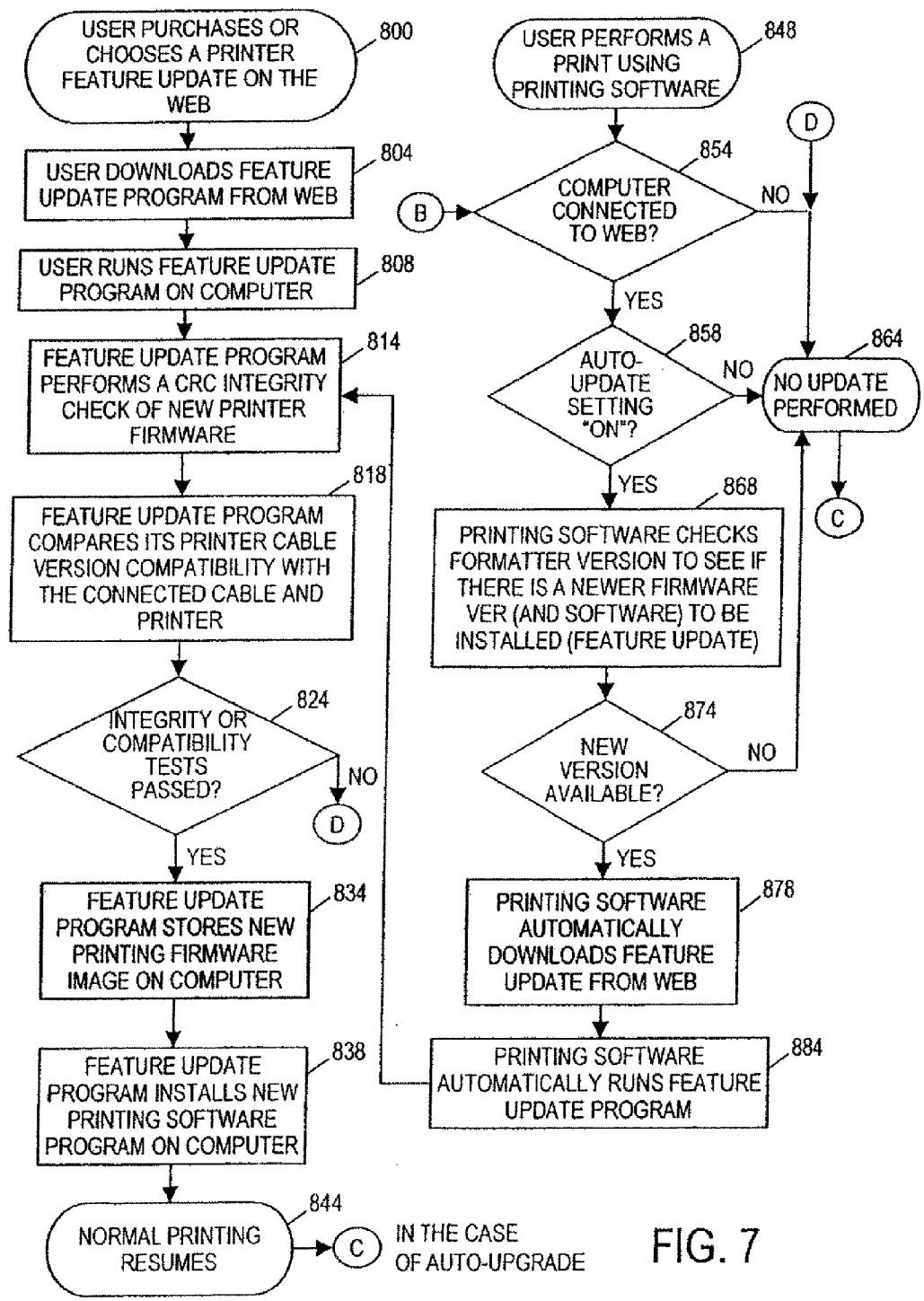
FIG. 7 is a flow chart illustrating the steps performed by the upgrade module of the system of FIG. 4 in accordance with one embodiment of the present invention.
Figure 8:
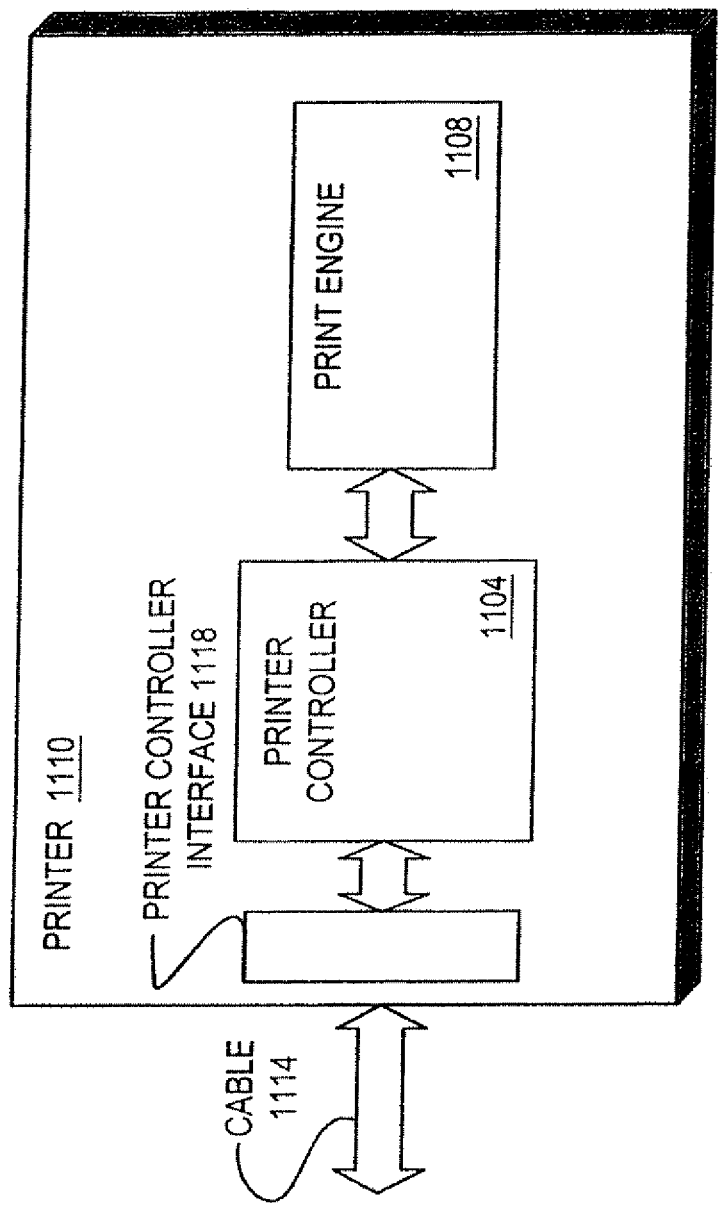
FIG. 8 illustrates a block diagram of a conventional laser printer.

After the processing that occurs in FIG. 8, processing returns to step 708 of FIG. 7 from step 844 or step 864 of FIG. 8. In step 708, the printing software 410 checks to determine if the printer formatter program 320 is installed in the printer formatter 54. In decision block 714, if the printer formatter program 320 is installed, then processing proceeds to step 724. Otherwise, processing continues at step 718. In step 718, the printing software 410 installs the printer formatter program 320 that is stored in the storage of the host 30 into the storage (e.g., RAM of the printer formatter).

In step 724, the printing software 410 performs an integrity check on the printer formatter program 320 in the printer formatter 54. The integrity check is for determining whether the bits in the printer formatter program 320 has been corrupted and can be a cyclic redundancy check (CRC) that is well known by those of ordinary skill in the art. In decision block 728, a determination is made whether the printer formatter program 320 has passed the integrity test. If the printer formatter program 320 fails the integrity test, then processing proceeds to step 718.

If the printer formatter program 320 passes the integrity test, then processing proceeds to step 734. In step 734, the printing software 410 checks the compatibility of the version of the printer formatter program to the version of the printing software 410. In decision block 738, a determination is made whether the compatibility test has been passed. If the compatibility test fails, then processing proceeds to step 744. In step 744, the printing software 410 instructs the user to perform a manual upgrade of the printer formatter program 320. If the compatibility test is successful, then in step 748 the printer controller ready data (PCRD) data stream is sent to the printer formatter 54.

Upgrade Module Operation

One aspect of the present invention is the provision of an upgrade module 430 that automatically or at user request connects to a source of more recent versions of the printer formatter program 320 and downloads the printer formatter program 320 to the printing software 410. The source can be, for example, an Internet web site of a developer of printer controller programs.

FIG. 7 is a flow chart illustrating the steps performed by the upgrade module of the system of FIG. 4 in accordance with one embodiment of the present invention. In step 800, a user purchases or chooses a printer feature update that is provided by a web site of the update provider. In step 804, the user downloads a feature update program from a web server 460. In step 808, the user runs the feature update program on the host 30. In step 814, the feature update program performs an integrity check (e.g., a CRC integrity check) of the new printer formatter program.

In step 818, the feature update program compares its PC card version with the connected PC card and office machine 40. In decision block 824, it is determined whether both the integrity and compatibility tests have been passed. If both tests have been passed, then in step 834 the feature update program stores the new printer formatter program 320 into the storage (e.g., non-volatile storage) in the host 30. In step 838 the feature update program installs the new printing software 410 on the host 30. Processing then continues to step 844 where normal printing resumes. Processing then proceeds to step 708 of FIG. 6.

In step 848 a user performs a print using printing software 228. In decision block 854, it is determined whether the host 30 is connected to the Internet. If the host 30 is not connected to the Internet, then no update is performed (step 864). Processing then proceeds to step 708 of FIG. 6.

If the host 30 is connected to the Internet, then in decision block 858, a determination is made whether an auto-update setting is on? If the auto-update setting is on, then in step 868 the printing software 410 compares the version of the printer formatter program 320 with the version of the most current printer formatter program residing on the web server 531 to determine if an update is needed.

In decision block 874, a determination is made whether a newer version of either the printer formatter program 320 or the printing software 410 is available. If a newer version of either is available, processing proceeds to step 878 where the newer version is downloaded. If a newer version of either is unavailable, no update is performed (step 864).

In step 878 the printing software 410 automatically downloads the feature update program from the web server 460. In step 884 the printing software 410 automatically runs the feature update program. Processing then continues to step 814.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

We claim:

1. A method of printing comprising:
executing a formatter program on a removable Personal Computer (PC) card that controls printer controller functions of a printer;
receiving printer formatter ready data from a host machine at a first interface of the removable PC card;
sending print engine ready data to the printer from a second interface of the removable PC card;
comparing a version of the formatter program to a version of an updated formatter program;
requesting the updated formatter program if the version of the formatter program is different than the version of the updated formatter program; and
downloading the updated formatter program from the host machine using the first interface when the second interface is coupled to the printer.

2. The method of claim 1, wherein the first interface connects to a printer cable which is coupled to the host machine.

3. The method of claim 1, wherein the second interface connects to a printer cable which is coupled to the printer.

4. A method of printing comprising:
executing a formatter program on a removable PC card that controls printer controller functions of a printer;
receiving printer formatter ready data from a host machine at a first interface of the removable PC card;
sending print engine ready data to the printer from a second interface of the removable PC card;
performing an integrity check on the formatter program;
requesting an updated formatter program if the integrity check fails; and
downloading the updated formatter program from the host machine using the first interface when the second interface is coupled to the printer.

5. The method of claim 4, wherein the first interface connects to a printer cable which is coupled to the host machine.

6. The method of claim 4, wherein the second interface connects to a printer cable which is coupled to the printer.

7. A removable PC card for removably coupling with a corresponding card slot in a printer, the removable PC card comprising:
an integrated circuit configured to execute a formatter program on the removable PC card that controls printer controller functions of the printer;
a first interface of the removable PC card configured to receive printer formatter ready data from a host machine; and
a second interface of the removable PC card configured to send print engine ready data to the printer,
wherein the integrated circuit is configured to:
compare a version of the formatter program to a version of an updated formatter program;
request the updated formatter program if the version of the formatter program is different than the version of the updated formatter program; and
download the updated formatter program from the host machine using the first interface when the second interface is coupled to the printer.

8. The removable PC card of claim 7 further comprising a memory linked to the integrated circuit and configured to store the formatter program.

9. The removable PC card of claim 7, wherein the removable PC card is a first PC card, and wherein a printer controller is updated by exchanging the first PC card with a second PC card.

10. The removable PC card of claim 7, wherein the first interface is configured to connect to a printer cable which is coupled to the host machine.

11. The removable PC card of claim 7, wherein the second interface is configured to connect to a printer cable which is coupled to the printer.

12. The removable PC card of claim 7, wherein the first interface is a universal serial bus interface, a parallel port interface, or an Ethernet interface.

* * * * *